United States Patent Office 3,337,405
Patented Aug. 22, 1967

3,337,405
PRODUCT FOR DENTAL USE INCLUDING A SILVER COMPLEX AND METHODS FOR SUCH USE
Georges Netien, Lyon, Jean Lacharme, Vurey-par-Genas, Isere, and Maurice Raymond and Pierre Savy, Lyon, France, assignors to Societe de Recherches Scientifiques, Lyon, France, a company of France
No Drawing. Filed June 24, 1963, Ser. No. 290,227
Claims priority, application France, Jan. 18, 1961, 41,127, Patent 882M; Mar. 15, 1961, Patent 1,291,735
9 Claims. (Cl. 167—60)

This application is a continuation-in-part of applicants' copending application Ser. No. 166,968, now abandoned.

This invention relates to silver containing substances and to methods of preparing and using the same- It is an object of the invention to provide for reducing the sensitivity of silver halides and the like to light.

It is a further object of the invention to enlarge the scope of use of the silver ion, especially with respect to pharmaceutical and agricultural products.

Still another object of the invention is to provide improved methods of preparing silver containing substances which have improved stability, especially with respect to light radiation.

The use of the silver ion in the field of general biology is very limited. This is due to an excessive systematic interpretation of the conclusions of the works of Raulin who demonstrated that infinitesimal traces of silver completely stop the development of *Sterigmatocystis nigra*, said conclusions being applied without discrimination as being valid with respect to any living cell, both animal and vegetable. The works of Raulin were the starting point of attempts undertaken with a view to using silver and its salts (the nitrate, colloidal silver and so forth) as antiseptics. In short, in the field of biology, silver was considered only as an antiseptic, astringent or caustic agent.

In another field, namely that of organic synthesis, the catalytic role of silver is well known. It is the object of the present invention to effect a novel, biocatalytic action of said metal which can be used both in the animal and in the vegetable fields.

In the animal field, it has now been determined that local therapeutic applications by means of silver chloride followed by ultra-violet irradiations permit the accelerated regeneration of superficial and subjacent tissues such as bone tissue in particular.

In the vegetable field, experiments carried out in the laboratory and in the soil have now demonstrated that slightly ionized salt, such as silver chloride, used under particular conditions in small doses, will not only have no toxic effect, but will, on the contrary, promote the development of crops and make it possible to obtain higher crop yields.

However, in both of the above uses, the rapid reduction of silver, from its salt, by light has the result that handling of the chloride or other halide encounter considerable difficulties.

The fact is obviously a well-known fact for photographers and whereas the speedy reduction of the metal out of its salt is required for the latter, it forms, in contradistinction, a very serious drawback for the biologist who requires the opposite result, that is, a very slow reduction. Consequently, the problem consists in resorting to a salt or a combination which is sufficiently stable for its use for biological purposes. Said conditions are not satisfied by any silver salt considered singly so that it is necessary to resort no longer to a single compound, but to a mixture provided with the desired properties.

Starting from chemical substances which are well-known for photographic purposes, applicants have obtained a novel product containing the silver metal in a form applicable for biological purposes, that is, which is non toxic.

It has been determined that silver chloride associated only with the double thiosulphate of silver and sodium, does not show a sufficient stability, as required for the uses disclosed hereinafter and thionates are essential.

Investigation, however, has shown, and this is achieved in accordance with a principal object of the present invention, that the use of silver chloride is greatly facilitated when it is used in mixture with a sliver complex adapted for use in the same biological sense. For example, according to the invention there may be employed double siver and sodium (or potassium) thiosulphate prepared in the presence of acid sodium sulphite, which causes the formation of thionates.

Thus, in accordance with one of the aspects thereof, the invention is characterized by the intimate mixing of silver chloride with thiosulphates and thionates of the same metal under predetermined balanced conditions between the quantity of thionate and the quantity of the other substances.

According to an important advantage of the invention, silver chloride prepared as indicated above reduces much more slowly than is ordinary, thus making its use for agricultural or medicinal purposes possible.

If the ultra-violet radiation emitted through a Wood Filter is used as sole parameter, it will be noted that the time required for obtaining an identical coloration between two thin layers respectively of silver chloride and of the silver complex, to which the present invention relates, is of the ratio of approximately 1 to 20.

This mixture of chloride and of the other sulphur products can be effected intimately only when using directly the reaction mixture obtained by the following process of preparation:

PROCESS OF PREPARATION

Silver chloride is prepared, in darkness or red light, by precipitation of a solution of $AgNO_3$ (1 kg. dissolved in distilled water under saturated conditions at 20° C.), the solubility at said temperature being 0.44, by an excess of sodium chloride (400 g. dissolved in distilled water under saturation conditions at a temperature of 20° C., the solubility being 2.8). After washing with distilled water, the silver chloride is dissolved, partly, in a concentrated solution of sodium thiosulfate (1 kg. in 0.700 liter of water). A volume of 200 milliliters of acid sodium sulphite (or 60 g. of neutral sodium sulphite) is added to the stirred suspension of silver chloride in the solution of double silver and sodium thiosulphate. The amount of non-dissolved substance, that is of silver chloride remaining in suspension corresponds to about 14 to 15% of the solid substances in the reaction. The other substances, that is the double silver and sodium thiosulphate constitute between (72 and 73%) and the sodium chloride obtained through the double decomposition constitutes (12 to 13%) and remains in the solution. The mixture is concentrated in vacuo under pressures ranging between 50 and 10 millimeters of mercury while the temperature on the outside of the vaporizing flask, and inside a jacket or water bath is equal to about 70 to 80° C., the concentration being continued until the product has lost almost all the water of the reaction medium so that its hydration is reduced below 5%. Complete desiccation may be obtained in the atmosphere in the dark or more speedily in an apparatus for concentration in vacuo, care being taken to lower the temperature outside the flask to 30 to 35° C. instead of 70 to 80° C. During the time required for said concentration, a fraction of the sulphite is decomposed so that sulphurous anhydride is produced. The remaining sulphite forms with the thiosulphate, thionates which ensure the desired stability of the final product during said drying operation and subsequently during the application of the reaction mixture.

The proportions referred to may vary but it has been determined that the above are the most economical.

PRESERVATION

The reaction mixture as obtained above is pulverized and passed through a sieve. These operations are preferably to be carried out with reduced ("weak") lighting or, better still, in a red light. Handling of the powder under strong light may cause a superficial bluing. The basic product is preserved in brown bottles provided with a ground stopper and preferably kept in a dark place.

PRODUCT

The reaction mixture which constitutes the ready-for-use base product and to which the present invention relates, is defined by the following composition in which the proportions are by weight. This is the composition of the product which is obtained by the above process of preparation:

| | Percent |
|---|---|
| Silver chloride (AgCl) | 14.3 |
| Double (dual) silver and sodium thiosulphate+ silver thionates ($Ag_2S_2O_3$, $2Na_2S_2O_3$, $2H_2O$+ $XAg_2S_nO_6$) | 72.6 |
| Sodium chloride (NaCl) | 13.1 |

The formula $XS_nO_6Ag_2$ used above for the silver thionate is to be construed as follows. Since chemical analysis allows ascertaining that the salt is actually a thionate but without it being possible to ascertain the value of $n$, the thionate may be a di, tri, . . . penta or hexathionate for instance, according as to whether $n$ has a value 2, 3 . . . 5 or 6, while the coefficient X is to be understood as meaning that the thionate obtained is not a simple thionate and that there is obtained a mixture, say of tri- and tetrathionates, which may be termed polythionate. In all cases, however, the theoretical percentage of silver in the product defined hereinabove is equal to 33.8%.

Theoretical yield taking into account the water of crystallization: 1.874 kg. of reaction mixture starting with 1 kg. of $AgNO_3$ and of 1 kg. of $Na_2S_2O_3$ and 200 milliliters of acid sodium sulphite. In practice the reaction mixture should contain at least 30% of silver by weight.

According to another object of the present invention, the above-defined base product is used advantageously in association with compounds having physiological or biological activity, such as steroids (cholesterol, ergosterol, etc.).

MEDICAL USES (a) The treatment of paradentosis, stomatitis, gingivitis, maxillo-facial diseases,
(b) Strengthening tooth implantation,
(c) Consolidation of certain fractures,
(d) Treatment of acne,
(e) Facial care.

The base product is used in association with sterols, in practice, cholesterol and ergosterol.

Due to the action of ultra-violet rays, the ergosterol is "activated" for formation of $D_2$-vitamin; the basic silver product accelerates this activation.

The cholesterol is not transformed into an active vitamin D product, but it does play the part of a filter absorbing noxious ultra-violet radiations of a wavelength of less than 2,500 A.

The adding of precursory sterols of compounds with vitamin D action (ergosterol, 7,8-dehydrocholesterol, 7-hydroxycholesterol or 22-dehydrocholesterol) is, although not compulsory since certain precursory sterols exist normally in the irradiated organism, nevertheless very important in the use of the complex: chloride-thionate-thiosulphate (or: silver chloride-thionate-thiosulphate) for the reasons indicated below.

EXAMPLE OF PREPARATION

| | G. |
|---|---|
| (a) Silver complex | 10 |
| (b) Cholesterol | 10 |
| (c) Ergosterol (or any other "activable" sterol) | 0.5 |
| (d) Fatty excipient (vehicle) such as jelly, balance to make 100 g. | |

EXAMPLE OF MODE OF OPERATION FOR A DENTAL TREATMENT

After a drying and a massage of the gum for 3-5 minutes, 2 to 3 decigrams of the above preparation are spread over the part to be treated, which is then subjected to an accurately localized ultra-violet irradiation. The time of irradiation varies from 1 to 3 minutes, depending on the progress of the treatment. This operation causes a degradation of the complex which can be detected by a blackening of the product. The region treated is then protected by a wad of cotton for 5 to 10 minutes, during which time the irradiated product continues its action "in situ."

CLINICAL OBSERVATIONS (1) February 1958, Mr. P., accountant, 60 years: Dento-alveolar pyorrhea of several years' standing having necessitated the extraction of the upper teeth. The patient started the treatment when the disease attacked the lower molars and showed the following signs in this phase: very substantial paradentosis with dental denudation and mobility of the incisor block; detached gums; constant bleeding of the gums; enterococci.

The treatment was carried out three times per week for a period of six months. There was very distinct consolidation of the teeth. The radiography shows a neo-osteogenesis. The gum-bleeding ceased.

Twelve more treatments were given in May 1959, then in 1960.

(2) July 1959, Professor Ch., surgeon, 65 years: Start of pyorrhea not noted. In 1954, mobility necessitated the extraction of the teeth $$\frac{87|}{|}$$

then of $$\frac{654|}{|}$$

and finally of $$\frac{321|}{|}$$

In 1958 the following teeth were still in the mouth:

$$\frac{|1234567}{|}$$

(the numberings given are the conventional numbers to indicate the teeth of both the upper and the lower maxillary bones, located on the right and left sides respectively; in the case under consideration, the numbers refer only to the teeth of the upper maxillary bone). The patient had difficulties in wearing an unstable and uncomfortable denture. Being obliged to agree to new extractions in order to enable the use of complete denture, the patient decided to undergo a treatment using the product of the present invention.

There was a slight mobility of the block $$\frac{|1234}{|}$$

The lower teeth were quite firm but the gum was detached. Several detachments of the gum were associated with infection. There also was some bleeding of the gums.

In December 1959, after a daily treatment lasting 3 months, the following results were noted: teeth stabilized, the patient is enabled to wear a skeletal denture placed in position.

In January 1961, after 20 treatments, no relapse.

(3) October 1962, Mrs. F. L., 37, housewife: Paradentosis of about ten years' standing, invading the whole mouth and associated with bleeding of the gums.

At the beginning of the treatment, there was a very substantial mobility (90%) of the two incisor blocks, associated with generalized, diffuse pain, the sensitiveness to heat and cold being very high.

The diagnosis was as follows: pyorrheic paradentosis, the main seat of which was on the following living teeth:

$$\frac{321|123}{321|123}$$

It should be added that the patient had colon bacilli and hepatic disorders associated with migraines.

*Treatment.*—Ligature of the two blocks $$\frac{321|123}{321|123}$$

Treatment with the silver complex during 3 months at the rate of three times per week.

*Results.*—The ligature was removed 5 weeks after the beginning of the treatment; at that time the patient was beginning to masticate; the X-ray photographs showed a neo-osteogenesis. Three months later, the gum-bleeding disappeared entirely and a complete stability of the teeth is ascertained by radiography.

(4) October 1962, Miss P., 33, hairdresser: Gingivostomatitis with generalized pyorrheic lysis; the state of the patient made it necessary to extract the teeth $$\frac{-|-}{6521|123}$$

The tooth $$\frac{2|-}{-|-}$$

had a 90% mobility, the remaining teeth were mobile; the gum, which was in very bad condition, showed stomatitis at the level of the lower molars. On the upper maxilla the inter-dental strips of flesh were nonexistent; the mucous membrane was red, swollen and sore; mastication practically impossible.

After treatment for a period of three months, at the rate of 4, then 3, applications of silver complex per week, the consolidation was such that the preparation of a bridge was contemplated, which bridge was fitted in April 1963.

Miss P. goes on holidays with her set of teeth restored. The X-ray photographs showed the development of the neo-osteogenesis.

EXAMPLE OF MODE OF OPERATION FOR TREATMENT OF ACNE

The same preparation was used as in the preceding example.

First of all makeup was removed and the skin was cleansed over the area to be treated. A light massage was carried out for 2 to 3 minutes. There was then applied to the area to be treated a thin layer of the above-described preparation (about 1 to 2 grams) which was then subjected to ultra-violet irradiation.

The irradiation time at the start of the treatment was half a minute, and exposure to the ultra-violet rays was gradually increased in the course of the treatment by one-half minute with each subsequent session, until exposures of 5 minutes to ultra-violet rays brought the treatment to an end.

When exposure to ultra-violet rays was completed, the irradiated area was covered with cotton for about 10 minutes to allow the compound to act in situ.

In the course of the treatment and prior to each exposure, the skin must be freed completely from all crusts, for the skin is full of waste material.

CLINICAL OBSERVATIONS (1) Miss B., 20 years old: Acne on right side. Treatments started on Nov. 15, 1958. Two treatments per week for 3 months. On Feb. 15, 1959, there were no new pimples. The old scars were much less distinct (have become blurred), the skin was healthy.

Mrs. F., 28 years old: Acne on the right and left sides of the face. Treatment started in January 1959. Two sessions per week. At the end of 4 months of treatment, no new pimples appeared. The skin became completely healthy.

(3) Mrs. G., 23 years old: Considerable acne on the right cheek bone. Treatment started in December 1958. Two sessions per week. After 8 sessions there were only a few new pimples. The skin was much healthier. At the end of 30 sittings, the acne had completely disappeared.

(4) Mrs. P. S., 40 years old: Considerable acne scars. The treatment was started in February 1959 at the rate of 1 session per week. At the end of 10 weeks the scars had substantially disappeared and were barely visible.

EXAMPLE OF MODE OF OPERATION FOR FACIAL CARE

The same preparation was used as for the treatment of acne.

Removal of makeup and complete cleansing of skin over the entire face and neck. The product was then applied with light massage, and irradiation with ultra-violet rays was carried out. At the start of the treatment the irradiation generally lasted 1 minute. After several treatments, irradiation was gradually increased to 10 minutes. After the irradiation, the face was covered with cotton to allow the compound to act in situ for 10 minutes. The face and neck were then washed.

CLINICAL OBSERVATIONS (1) Mrs. G., 50 years old: Wrinkles around the eyes and pronounced rictus of the lips. Treatment started in January 1959 at the rate of 2 sittings per week. At the end of 3 months of treatment, the wrinkles around the eyes and the rictus of the lips had become much less distinct (very much blurred).

(2) Mrs. T., 60 years old: Face and neck very wrinkled. The skin was aged (faded and shrunk). The treatment was started in January 1959. 3 sittings per week. At the end of 1 month of treatment, a slight improvement was already noted. The wrinkles were slightly less distinct. The texture of the skin had a firmer appearance. At the end of 3 months, the wrinkles had faded considerably, the skin had retrieved great elasticity. The appearance of the face and neck was clear.

AGRICULTURAL USES

The above-described base product is used only after having been diluted with an inert powder such as heavy calcium carbonate. The dilution varies with the mode of application. Optimum concentrations vary, depending on the species of plant to be treated.

EXAMPLES OF PREPARATIONS DEPENDING ON THE DIFFERENT USES (1) *Mixture for scattering on the ground*

The basic product is distributed over ground after dilution with a neutral carrier such as calcium carbonate, sand, dry earth and the like while a catalyst such as dried blood furthers the application without being essential.

The mixture is distributed by means of the usual apparatus.

The total amount of active product corresponds to doses defined by accurate experiments executed in the laboratory and in the field and the use of said product relies on the following experimental results:

Cereals (wheat, barley or oats) have been cultivated on grounds carrying respectively 1000 g., 100 g., 1 g. and 0.01 g. of the active principles (silver polythionate) for 10,000 kg. of earth.

The crop obtained showed that the active ingredient at all doses is a stimulating factor. The activity is at a maximum for a dose of 10 g., for 10,000 kg. of earth.

A slight modification in the sensitivity of the species on the one hand and the necessity of a commercial use on the other hand, depending on the cost-price leads to a preference for doses ranging between 1 g. and 0.10 g. as concerns graminaceous plants, polygonaceous plants (buckwheat), chenopodiaceous plants (spinach and beetroot) and doses of 10 to 1 g. for other botanical families, chiefly solanaceous and cucurbitaceous plants.

The mixture is composed as follows:

| | Percent |
|---|---|
| Silver complex | 1 to 10 |
| Dried blood | 5 |
| $CaCO_3$ | Bal. |

*Results of test executed by scattering over the ground*

Experiments made at Botanical garden of the Doctors' and Chemists' Faculty of Avenue Rockefeller, Lyon, France.

(a) Nature of the experiments of Izarra barley and on Furie oats.

Schedule of experiments: Executed in pots containing 5 kg. of garden earth, five repetitions for each series of experiments and for the control pots (30 seeds per pot).

RESULTS FOR BARLEY

| | Average height of the plants, cm. | Number of plants | Number of stalks | Number of ears | Weight of seeds, g. | Weight of straw, g. |
|---|---|---|---|---|---|---|
| Controls | 64.4 | 120 | 254 | 228 | 178.10 | 183 |
| Treatment with 10 g | 71.2 | 113 | 390 | 365 | 292.2 | 371 |
| Treatment with 0.10 g | 66.8 | 121 | 321 | 270 | 209.60 | 212 |

RESULTS FOR OATS

| | Average height of the plants, cm. | Number of plants | Number of stalks | Number of ears | Weight of seeds, g. | Weight of straw, g. |
|---|---|---|---|---|---|---|
| Controls | 65.4 | 124 | 310 | 250 | 137.5 | 330 |
| Treatment with 10 g | 77.8 | 117 | 368 | 249 | 159.5 | 435 |
| Treatment with 0.10 g | 92 | 111 | 364 | 268 | 270.1 | 723 |

(b) Nature of experiments: On peas in vegetative pots containing 1 kg. of garden earth; fourteen repeated experiments in each series of experiments and in the control experiment.

After shooting, three plants per pot have been retained and the crop has thus been obtained with 12 plants in each series of experiments.

| | Number of pods | Weight of pods, g. | Number of peas | Weight of peas, g. |
|---|---|---|---|---|
| Controls | 23 | 27.7 | 34 | 9.6 |
| Treatment with 1.000 g | 24 | 38.5 | 39 | 12.5 |
| Treatment with 10 g | 27 | 37 | 53 | 11.8 |
| Treatment with 0.10 g | 27 | 33.3 | 44 | 10.8 |

(2) *Coating of seeds*

The basic product is diluted with heavy calcium carbonate, to which cholesterol and paraffin oil are added. The latter substances insure a better distribution, adhesion and diffusion of the product at the level of the seed. The concentrations of active constituent vary between 1 and 25%, depending on the species. The amount of coating product is of the order of 200 to 600 g. per quintal (approximately a hundredweight) of seeds, said amount depending on the morphology of the seeds.

As far as this technique is concerned, the silver complex may advantageously be added to preparations including fungicidal substances used for the disinfecting of seeds such as, for example, organomercuric compounds, cupric compounds, dimethyl-dithiocarbamate of zinc, dimethyl-dithiocarbamate of iron, ethylene bis-dithiocarbamate of zinc, and so forth.

The concentration of the silver base product cannot be given for all the species since the absolute amounts of the product adhering to the seeds depend on their morphological properties (seeds having a smooth or corrugated tegument etc.). Thus, tomato seeds require 50 g. of the final product including the excipient for each kg. of seed, whereas corn grains which are much larger and smoother, require only 3.6 g. of product per kg. of seeds.

RESULTS OF THE EXPERIMENTS (a) Tomatoes of the Morand variety, 1959, at Aix-en-Provence, Bouches-du-Rhone, France.

The coating of 1 kg. of tomato seeds has been performed with 50 g. of the final product containing 1 g. of active product.

The sowing has been performed under forcing frames on Mar. 19, 1959. The thinning out was executed on May 12, 1959, and the crops have been collected between July 30 and Oct. 12, 1959.

The total weights of the crops are as follows:

| | Kg. |
|---|---|
| Control Plants | 379.222 |
| Plants obtained with coated seeds | 479.334 |

(b) Sugar beetroots 1959, 1960, at Mereville, Seine-et-Oise, France.

*Schedule of the experiments.*—Experiments made through the block method. 5 or 6 repetitions. Product used: silver compound used alone at various concentrations and the same associated with a cupric fungicide such as copper oxinate.

1959—The seeds were coated as follows: a first experiment has been made with 0.05 g. of active product for each kg. of seeds admixed with 49.95 g. of calcium carbonate.

Upon weighing of the crop, the yield of roots obtained with the treated seeds was 26.7 metric tons per hectare. The control seeds have produced only 22.6 metric tons per hectare which means the treated grains show an increase in yield of 18.3%.

A second experiment has been conducted with 0.5 g. of active product incorporated with 49.5 g. of an excipient (calcium carbonate) for each kg. of seeds.

When weighing the crops, the yield of the treated grains reached 25.4 metric tons per hectare whereas the control seeds produced only 23.5 tons per hectare, which means an increase of 8.26%.

During experiments made in 1960, the seeds were coated with 1 g. of active product for each kg. of seeds in admixture with 49 g. of calcium carbonate.

The weights of the crops were 53.3 metric tons per hectare which means an increase of 9.19%.

A further experiment has been executed with 0.25 g. of the active product admixed with 49.75 g. of calcium carbonate for each kg. of seeds.

The weights of crops obtained were 50.5 metric tons per hectare which means an increase by 4.33%.

A last experiment has been performed with 0.5 g. of active product admixed with 49.5 g. of calcium carbonate for each kilogram of seeds. The weights of crop measured were 50.2 tons per hectare, which means an increase by 3.71%.

The control plants have produced for the three experiments made, the same weight of 48.4 metric tons per hectare.

(c) String beans at Barreuil, North of France by the Chevrier firm which produces tinned vegetables.

*Schedule of operation.*—In strips and in a repeated manner. Collecting through removal of 11 batches of 30 plants off a same line of the field.

Coating of the seeds at the rate of 1 g. of active product associated with 49 g. of calcium carbonate for each kg. of seeds.

Results obtained:

|  | Weight of plants | Weight of beans |
|---|---|---|
| Control grains, kg | 10.130 | 7.395 |
| Treated seeds, kg | 13.180 | 8.340 |
| Increase, percent | 30.1 | 15.41 |

To ensure a checking in the same area, a quarter of a hectare has been harvested and the weights obtained were:

|  | Weight of plants | Weight of beans |
|---|---|---|
| Control grains, kg | 1,970 | 464 |
| Treated seeds, kg | 2,640 | 543 |
| Increase, percent | 24.87 | 17.41 |

(d) Spinach: Experiments made in 1960 at Valayane (vaucluse), France, under the control of the Technical Center for Tinned Agricultural Products, 10, rue Fauchier, Aix-en-Provence, France.

*Schedule of operation.*—In strips with three repetitions.

Coated seeds with 0.5 g. of active product for each kg. of seeds admixed with 49.5 g. of calcium carbonate.

Sown on Mar. 21, 1960, harvested on May 24, 1960, variety "Geant d'ete": Results per hectare: control seeds 18.787 kg.; treated seeds 26,000 kg. Variety "Rueil": Results per hectare, control seeds, 6,416 kg.; treated seeds 15,625 kg.

(e) Corn: Experiments made in 1960 at Puy Saint Martin, Drome, France, by Mr. Moulin, variety U-26.

*Schedule of operation.*—in strips with repetitions.

Coating of the seeds with 0.1 g. of active product admixed with 3.5 g. of calcium carbonate for each kg. of seeds. Increase in yield 11.3%.

(f) Wheat: Experiments made in 1958 at Roquebrune-sur-Argens, Var, France, by Mr. de Bourbon, variety Florence Aurore.

*Schedule of operation.*—Experiments in the field, half of the seeds sown have been treated with the product. Coating of the seeds with 0.1 g. of active product admixed with 5 g. of calcium carbonate per kg. of grains. Increase in yield 36%.

(g) Rice: Experiments made in 1958 at Mas-de-Vert, Arles, Bouches-du-Rhone, France, by Mr. Mital.

Variety: Balila

*Schedule of operation.*—In blocks with repetitions.

Coating of the seeds with 0.05 g. of active product, admixed with 5 g. of calcium carbonate for each kg. of seeds, increase in yield 7.11% by weight.

(3) *Dusting or sprinkling of roots upon thinning out of the plants for replanting the seedlings*

The following mixture has been used:

| | Percent by wt. |
|---|---|
| Silver compound | 0.1 to 1 |
| Cholesterol | 1 to 2 |

REMARKS CONCERNING AGRICULTURE

Tomatoes of the Morand variety were experimented upon in 1959 at Aix-en-Provence, Bouches du Rhone, France.

*Schedule of the experiment.*—Latin patches, four repetitions, one control batch.

One batch of the seeds have been coated in accordance with the procedure precedingly described with reference to the coating of tomato seeds, that is a 2% treatment. The roots of the tomato plants have been sprinkled at the moment of the thinning out with a product containing 0.1% of active product.

The further treatment performed during the thinning out has led to an increase of 38.4% with reference to the witness seeds.

*Conclusions.*—The silver compound provided according to the invention improves the growth of the plants and allows an early growth and chiefly an increase in yield. The complete treatment including a coating of the seeds and a dusting of the roots clearly produces better results than the covering of the seeds by itself.

In the claims which follow hereinafter the base product obtained and employed according to the invention may be, for the sake of convenience, referred to as a desensitized silver chloride-thionate (or halide-thionate) complex which term will be intended to include the thiosulphate and thionate ingredients as indicated above.

What is claimed is:

1. A reaction product for dental use by topical application of the gums of a patient comprising a mixture of a silver complex consisting essentially of about 14% silver chloride, 72% silver and sodium thiosulphates and silver thionate, and 14% sodium chloride, and a vitamin D active steroid compound, said silver complex being present in an amount in relation to the steroid compound sufficient to activate the latter, said silver complex being prepared by precipitating silver chloride from a solution of 1 kg. of silver nitrate by addition of an excess of sodium chloride thereto, dissolving the silver chloride in a concentrated solution of 1 kg. sodium thiosulphate, adding 60 g. of neutral sodium sulfite to the solution and concentrating the solution in vacuo at a temperature of 70 to 80° C.

2. A product as claimed in claim 1 wherein said steroid compound is selected from the group consisting of ergosterol, 7,8-dehydrocholesterol, 7-hydroxycholesterol, and 22-dehydrocholesterol.

3. A product as claimed in claim 1 further comprising cholesterol and petroleum jelly.

4. A product as claimed in claim 3 wherein the reaction product comprises by weight about 10% of the silver complex, 10% of the cholesterol, 5% of the vitamin D active steroid and the petroleum jelly to make up 100%.

5. A method for treating a patient for pyorrhea, paradentosis, stomatitis, gingivitis, and for strengthening teeth and dental implants, comprising wiping the patient's gums until dry, massaging for a short time, and topically applying to the gum area to be treated 2 to 3 decigrams of a medicinal mixture constituted of a silver complex comprising 14% silver chloride, 72% silver and sodium thiosulphates and silver thionate, and 14% sodium chloride, said silver complex being present in the mixture in an amount of about 10% by weight together with 10% cholesterol, 5% ergosterol, and a fatty excipient in a quantity sufficient to make up 100%, irradiating for a few minutes the area coated with said medicinal composition by means of ultraviolet rays, protecting said area with a dressing for a few minutes to prevent the action of the saliva, and allowing said composition to act "in situ," said silver complex being prepared by precipitating silver chloride from a solution of 1 kg. of silver nitrate by addition of an excess of sodium chloride thereto, dissolving the silver chloride in a concentrated solution of 1 kg. sodium thiosulphate, adding 60 g. of neutral sodium sulfite to the solution and concentrating the solution in vacuo at a temperature of 70 to 80° C.

6. A dental treatment method comprising topically applying to the gums of a subject a mixture of a silver complex consisting essentially of about 14% silver chloride, 72% silver and sodium thiosulphates and silver thionate, and 14% sodium chloride, and a vitamin D active steroid compound, said silver complex being present in an amount in relation to the steroid compound sufficient to activate the latter, and irradiating the mixture with ultra-violet rays, said silver complex being prepared by precipitating silver chloride from a solution of 1 kg. of silver nitrate by addition of an excess of sodium chloride thereto, dissolving the silver chloride in a concentrated solution of 1 kg. sodium thiosulphate, adding 60 g. of neutral sodium sulfite to the solution and concentrating the solution in vacuo at a temperature of 70 to 80° C.

7. A method as claimed in claim 6 wherein said steroid compound is selected from the group consisting of ergosterol, 7,8 - dehydrocholesterol, 7 - hydroxycholesterol, and 22-dehydrocholesterol.

8. A method as claimed in claim 6 comprising applying a protective dressing onto said mixture after the irradiation to prevent the action of the saliva and permit the mixture to act "in situ."

9. A method as claimed in claim 8 wherein said mixture further comprises cholesterol and petroleum jelly.

References Cited

UNITED STATES PATENTS

| | | | |
|---|---|---|---|
| 2,248,905 | 7/1941 | Ham et al. | 96—61 |
| 2,782,121 | 2/1957 | Goldhammer | 96—61 |
| 3,022,216 | 2/1962 | Sijpesteijn | 167—38 |
| 3,034,956 | 5/1962 | Baker | 167—38 |
| 3,035,968 | 5/1962 | Degoli | 167—68 |
| 3,081,227 | 3/1963 | Wimberly | 167—60 |
| 3,130,034 | 4/1964 | Young | 71—1 |
| 3,143,459 | 8/1964 | Marks et al. | 167—42 |
| 3,143,460 | 8/1964 | Pearce | 167—42 |
| 3,162,576 | 12/1964 | Glenn | 167—58 |
| 3,169,902 | 2/1965 | Gruenhagen | 167—22 |
| 3,171,782 | 3/1965 | Fellonneau | 167—60 |
| 3,178,345 | 4/1965 | Schlagel | 167—58 |
| 3,180,721 | 4/1965 | Weil | 71—2.3 |
| 3,183,073 | 5/1965 | Preston | 71—1 |
| 3,184,377 | 5/1965 | Hensel et al. | 167—22 |
| 3,186,824 | 6/1965 | Flenner | 71—2.3 |

FOREIGN PATENTS

| | | |
|---|---|---|
| 768,401 | 2/1957 | Great Britain. |
| 822 | 10/1961 | France. |

LEWIS GOTTS, *Primary Examiner.*

R. L. HUFF, *Assistant Examiner.*